US010968851B2

(12) United States Patent
Tsukio

(10) Patent No.: US 10,968,851 B2
(45) Date of Patent: Apr. 6, 2021

(54) BOOSTER DEVICE FOR DRIVING INJECTOR

(71) Applicant: Hitachi Automotive Systems, Ltd., Hitachinaka (JP)

(72) Inventor: Koichi Tsukio, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 380 days.

(21) Appl. No.: 15/749,930

(22) PCT Filed: Jul. 25, 2016

(86) PCT No.: PCT/JP2016/071659
§ 371 (c)(1),
(2) Date: Feb. 2, 2018

(87) PCT Pub. No.: WO2017/033643
PCT Pub. Date: Mar. 2, 2017

(65) Prior Publication Data
US 2018/0230923 A1      Aug. 16, 2018

(30) Foreign Application Priority Data

Aug. 21, 2015   (JP) .............................. JP2015-163320

(51) Int. Cl.
*F02D 41/20* (2006.01)
*F02M 61/10* (2006.01)
(Continued)

(52) U.S. Cl.
CPC ........... *F02D 41/20* (2013.01); *F02D 41/402* (2013.01); *F02M 61/10* (2013.01); *F02D 41/08* (2013.01);
(Continued)

(58) Field of Classification Search
CPC ........ F02D 41/20; F02D 41/402; F02D 41/08; F02D 2041/2003–2024;
(Continued)

(56) References Cited

U.S. PATENT DOCUMENTS

2009/0015223 A1* 1/2009 Kakehi ................... F02D 41/20
   323/282
2009/0243574 A1* 10/2009 Mayuzumi .............. F02D 41/20
   323/282

(Continued)

FOREIGN PATENT DOCUMENTS

DE   10 2010 040 123 A1   3/2011
JP     2002-13430 A        1/2002
(Continued)

OTHER PUBLICATIONS

International Search Report (PCT/ISA/210) issued in PCT Application No. PCT/JP2016/071659 dated Oct. 11, 2016 with English translation (Four (4) pages).

(Continued)

*Primary Examiner* — Erick R Solis
*Assistant Examiner* — Robert A Werner
(74) *Attorney, Agent, or Firm* — Crowell & Moring LLP

(57) ABSTRACT

Provided is a booster device for driving an injector which can suppress an insufficiency of a boost voltage applied to the injector even when the fuel injection interval is short. A boost driver (switching element) is connected to a boost coil in series and turns on/off the conduction of the boost coil. A boost capacitor applies a voltage to the injector. A boost diode has an anode connected to a connection point of the boost coil and the boost driver and a cathode connected to the boost capacitor. A boost gate control circuit controls the boost driver to be turned on/off so as to increase a charging speed of the boost capacitor increases when a decision
(Continued)

period indicating a period corresponding to an injection interval of the injector is equal to or less than the first threshold value.

9 Claims, 9 Drawing Sheets

(51) Int. Cl.
*F02D 41/40* (2006.01)
*F02D 41/08* (2006.01)
*F02M 51/06* (2006.01)
*F02D 41/38* (2006.01)

(52) U.S. Cl.
CPC ............... *F02D 2041/2006* (2013.01); *F02D 2041/2013* (2013.01); *F02D 2041/2058* (2013.01); *F02D 2041/2068* (2013.01); *F02D 2041/389* (2013.01); *F02M 51/06* (2013.01)

(58) Field of Classification Search
CPC ...... F02D 2041/2058–2068; F02D 2041/2006; F02D 2041/201; F02D 2041/2013; F02D 2041/2017; F02D 2041/202; F02D 2041/2024; F02D 2041/2027; F02D 2041/2051; F02D 2041/2055
USPC .......................................... 701/105; 123/490
See application file for complete search history.

(56) References Cited

U.S. PATENT DOCUMENTS

| | | | | |
|---|---|---|---|---|
| 2014/0316679 A1* | 10/2014 | Nishida | ............... | F02D 41/20 701/104 |
| 2016/0003182 A1* | 1/2016 | Fujii | ............... | F02D 41/20 123/478 |
| 2016/0079850 A1* | 3/2016 | Cresswell | ............... | B60L 50/10 307/9.1 |
| 2016/0265469 A1* | 9/2016 | Harada | ............... | F02D 41/20 |

FOREIGN PATENT DOCUMENTS

| | | | |
|---|---|---|---|
| JP | 2005-120983 A | | 5/2005 |
| JP | 2005-163625 A | | 6/2005 |
| JP | 2006-336568 A | | 12/2006 |
| JP | 2006336568 A | * | 12/2006 |
| JP | 2009-296721 A | | 12/2009 |
| JP | 2009296721 A | * | 12/2009 |
| JP | 2011-52631 A | | 3/2011 |
| JP | 2012-157091 A | | 8/2012 |
| JP | 2014-159772 A | | 9/2014 |
| JP | 2014-214693 A | | 11/2014 |

OTHER PUBLICATIONS

Japanese-language Written Opinion (PCT/ISA/237) issued in PCT Application No. PCT/JP2016/071659 dated Oct. 11, 2016 (Six (6) pages).
Extended European Search Report issued in counterpart European Application No. 16838990.6 dated Mar. 20, 2019 (nine (9) pages).

* cited by examiner

BOOSTER DEVICE FOR DRIVING INJECTOR

TECHNICAL FIELD

The present invention relates to a booster device for driving an injector.

BACKGROUND ART

A fuel injection valve control device, which can perform appropriate fuel injections over a range from a low rotation region to a high rotation region of an engine rotation speed without requiring a capacitor having a large capacity, has been known (e.g., see PTL 1).

PTL 1 discloses a control which has a function of detecting a current of a solenoid used for a boost and changes a target voltage according to the current value in a booster circuit in a fuel injection valve-opening control. The device of PTL 1 also controls a duty ratio of a boost FET so that the target voltage becomes a voltage which should be applied to the solenoid at the next fuel injection based on the detected current.

Moreover, an injector drive device, in which, while the heat generation of a transistor for charging is suppressed at high temperature, the charging can be sufficiently completed by the time of the next injection process as a charging time is shortened as much as possible even if a small-capacity charge capacitor is used, has been known (e.g., see PTL 2).

PTL 2 discloses a control which has a temperature detection unit and a plurality of temperature threshold values and increases a charging current stepwise when the temperature is judged as being lower than a predetermined temperature threshold value in a booster circuit in a fuel injection device. The device of PTL 2 also controls the charging current to be increased when a present voltage is decided as being lower than a predetermined voltage.

Furthermore, a control device, which prevents a temperature rise in an ECU by suppressing the heat generation of the ECU without using an additional cooling device such as a blower fan (e.g., see PTL 3).

PTL 3 discloses a control which adjusts a target voltage for a boost by using at least one of the temperature of the ECU, an outside air temperature, a vehicle speed and a cooling water temperature in a fuel injection device performing multiple injections.

CITATION LIST

Patent Literatures

PTL 1: JP 2005-163625 A
PTL 2: JP 2014-214693 A
PTL 3: JP 2014-159772 A

SUMMARY OF INVENTION

Technical Problems

In the technique disclosed in PTL 1, continuous injection timings of the fuel injection device are not intended, and the boost FET is controlled by determining boost voltage values for the next and subsequent timings based on only the present current value. Because of this, when the present and next injection timings are close, a boost voltage for opening a valve of the injector becomes insufficient, and a speed of opening the valve of the injector becomes slow. Since this insufficiency of the boost voltage is not intended in the fuel injection device, each fuel injection characteristic differs at the times of multiple injections.

Also in the technique disclosed in PTL 2, as described above, continuous fuel injection timings of the fuel injection device are not intended. Thus, when the present and next injection timings are close, a boost voltage for opening a valve of the injector becomes insufficient, and a speed of opening the valve of the injector becomes slow so that each fuel injection characteristic differs at the times of multiple injections. Moreover, since the charging current is controlled when the temperature is judged as being lower than the predetermined temperature threshold value, the charging current is not controlled when the circuit has a high temperature so that the temperature of the circuit rises. Since this temperature rise is not intended in the booster circuit, there is a possibility that the circuit burns out when the temperature rises excessively.

Also in the technique disclosed in PTL 3, as described above, continuous fuel injection timings of the fuel injection device are not intended. Thus, when the present and next injection timings are close, a boost voltage for opening a valve of the injector becomes insufficient, and a speed of opening the valve of the injector becomes slow so that each fuel injection characteristic differs at the times of multiple injections. Moreover, since the boost target voltage is lowered for the purpose of protecting the circuit when the temperature rises excessively, each fuel injection characteristic differs more conspicuously.

An object of the present invention is to provide a booster device for driving an injector, which can suppress an insufficiency of a boost voltage applied to the injector even when a fuel injection interval is short.

Solution to Problems

In order to achieve the above object, the present invention includes a coil, a switching element which is connected to the coil in series and turns on/off the conduction of the coil, a capacitor for applying a voltage to the injector, a diode having an anode connected to a connection point of the coil and the switching element and a cathode connected to the capacitor, and a control circuit which controls the switching element to be turned on/off so as to increase a charging speed of the capacitor when a decision period indicating a period corresponding to an injection interval of the injector is equal to or less than the first threshold value.

Advantageous Effects of Invention

According to the present invention, even when the fuel injection interval is short, the insufficiency of the boost voltage applied to the injector can be suppressed. Problems, configurations, and effects other than those described above will be apparent from the following description of the embodiments.

BRIEF DESCRIPTIONS OF DRAWINGS

DESCRIPTION OF EMBODIMENTS

Hereinafter, the configurations and operations of booster devices for driving the injector according to the first to fourth embodiments of the present invention will be described using the drawings. Note that the same reference signs denote the same parts in each drawing.

First Embodiment

Figure 1:
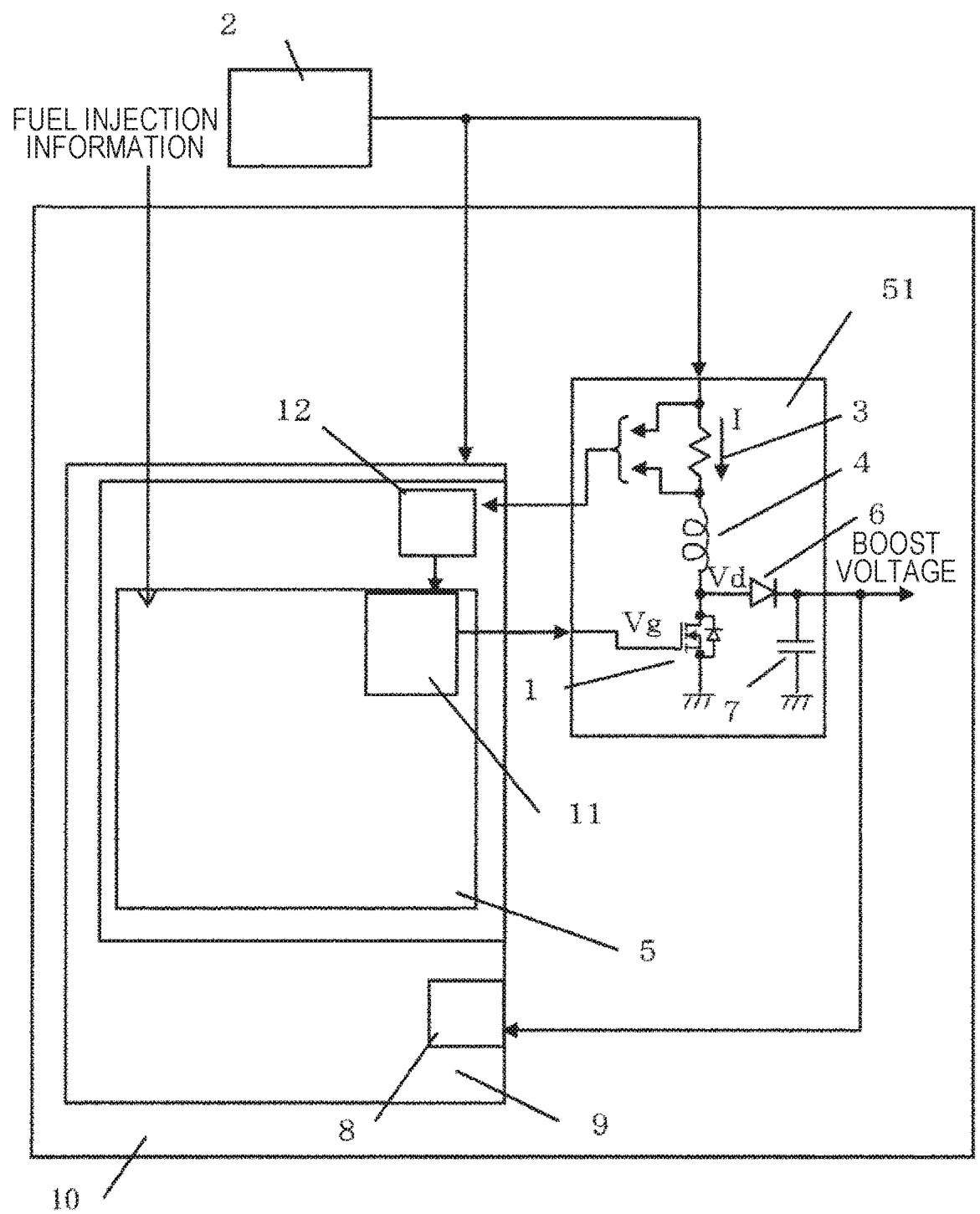
FIG. 1 is a configuration diagram of a booster device for driving an injector according to the first embodiment of the present invention.

By using FIG. 1, the configuration of a booster device for driving an injector 10 according to the first embodiment of the present invention will be described. When a gate voltage Vg of a boost driver 1 is turned on, a current I flows to a GND from a battery 2 through a shunt resistor 3, a boost coil 4 and the boost driver 1.

In other words, the boost driver 1 (switching element) turns on/off the conduction of the boost coil 4. Note that the boost driver 1 is, for example, a metal oxide semiconductor field effect transistor (MOSFET).

The current at this time is detected as a voltage across the shunt resistor 3 by a current monitor circuit 12 included in a booster circuit drive unit 5 inside a driver IC 9. When a set maximum current threshold value is detected, a boost gate control circuit 11 turns off the boost driver 1. At this time, the current I flows to a boost diode 6 by the counter electromotive force of the boost coil 4. A boost capacitor 7 plays a role to temporarily accumulate the current flowing to the boost diode 6.

Herein, the boost capacitor 7 applies a boost voltage to a fuel injection valve (injector) through a driver (not shown) which drives the fuel injection valve. The boost diode 6 has an anode connected to a connection point of the boost coil 4 and the boost driver 1 (switching element) and a cathode connected to the boost capacitor 7.

Next, when the current flowing in the shunt resistor 3 becomes small, the boost driver 1 is turned on again to increase the current value. By repeating the above, the current continues to flow to the boost diode 6, and the boost voltage is generated by accumulating the current in the boost capacitor 7. Meanwhile, a boost voltage monitor circuit 8 is provided in the driver IC 9 to monitor the boost voltage so that the boost is performed when the voltage is low and the boost is stopped when the voltage reaches a predetermined value.

Figure 2:
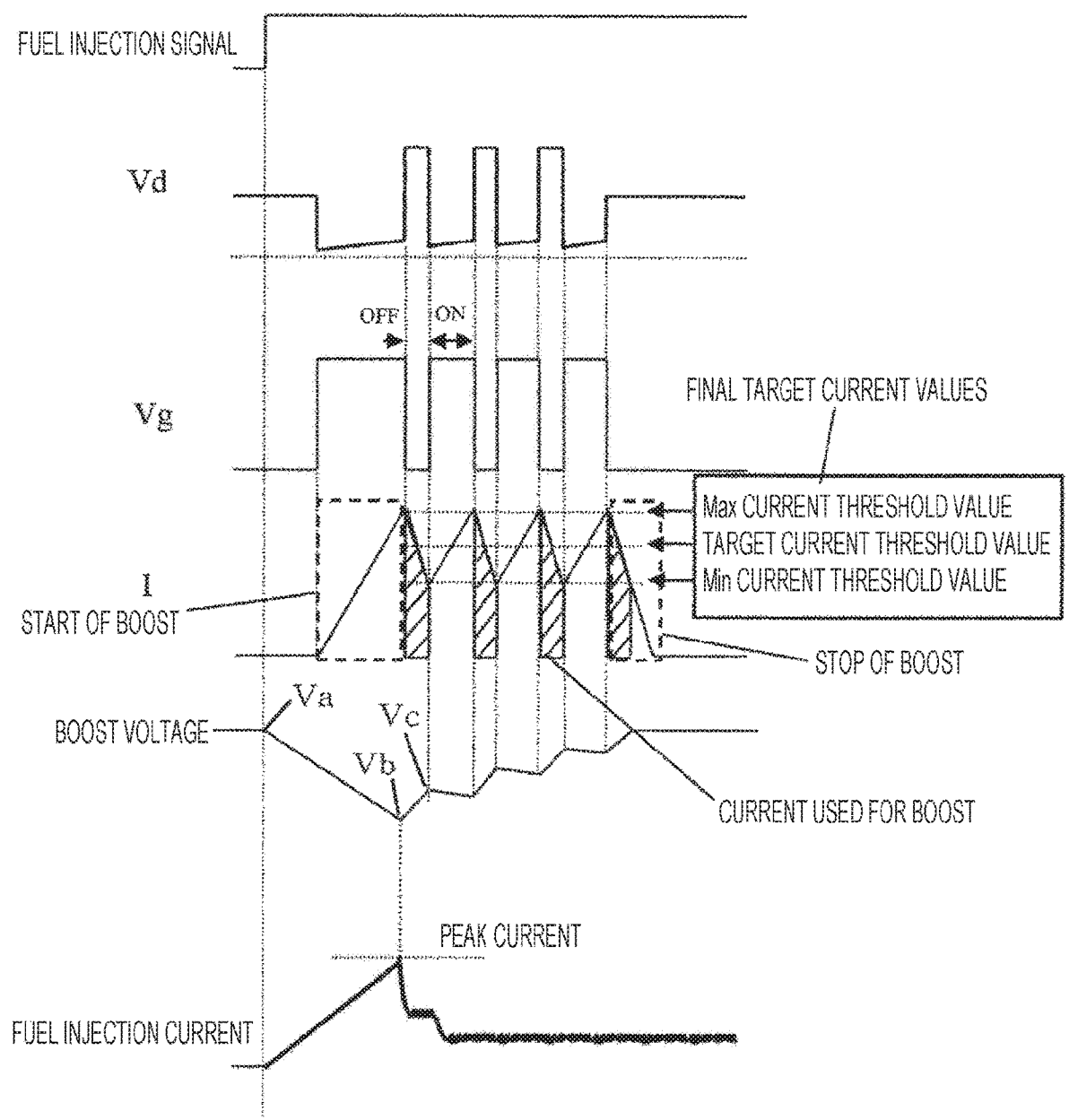
FIG. 2 is a diagram showing waveforms of boost operations of the booster device for driving the injector shown in FIG. 1.

FIG. 2 shows waveforms of the boost operations. A gate signal for turning on the boost driver 1 is Vg. When the gate signal Vg is turned on, a drain voltage Vd of the boost driver 1 falls to around 0 V, and the current I increases. When the current I reaches a set maximum current with respect to a target current value, the gate signal Vg of the boost driver 1 is turned off. At this time, Vd reaches to be equivalent to the boost voltage, and the current I flows toward the boost diode 6 and is accumulated in the boost capacitor 7, but the current value itself decreases with time.

To turn on the boost driver 1 again when the current I reaches a set minimum current, the operations in FIG. 2 are performed by repeating these operations. These operations in FIG. 2 are performed until the boost voltage reaches a set value. Note that the hatched portions in the drawing are the actual current flowing through the boost diode 6 and are the current used for the boost. When this operation is performed, the waveform becomes like that of the boost voltage in FIG. 2. When injection from a fuel injection valve is started, the boost voltage decreases until a fuel injection current reaches a peak current. Since the boost voltage is not used after the peak current is reached, the boost voltage gradually recovers by switching drive of a booster circuit 51. When Vg is turned off, the current flows to the boost capacitor 7 so that the boost voltage rises. When Vg is turned on, no current enters the boost capacitor 7 so that the boost voltage does not rise (slightly decreases due to spontaneous discharge). By repeating these, the boost is performed by Vg switching until the boost voltage reaches a predetermined value.

An object of this embodiment is to eliminate the difference between the fuel injection characteristics, which is caused by an insufficiency of the boost voltage upon a close injection timing at which the next fuel injection is performed before the boost voltage for performing the fuel injection reaches a target voltage, when the fuel injection is performed.

Figure 3:
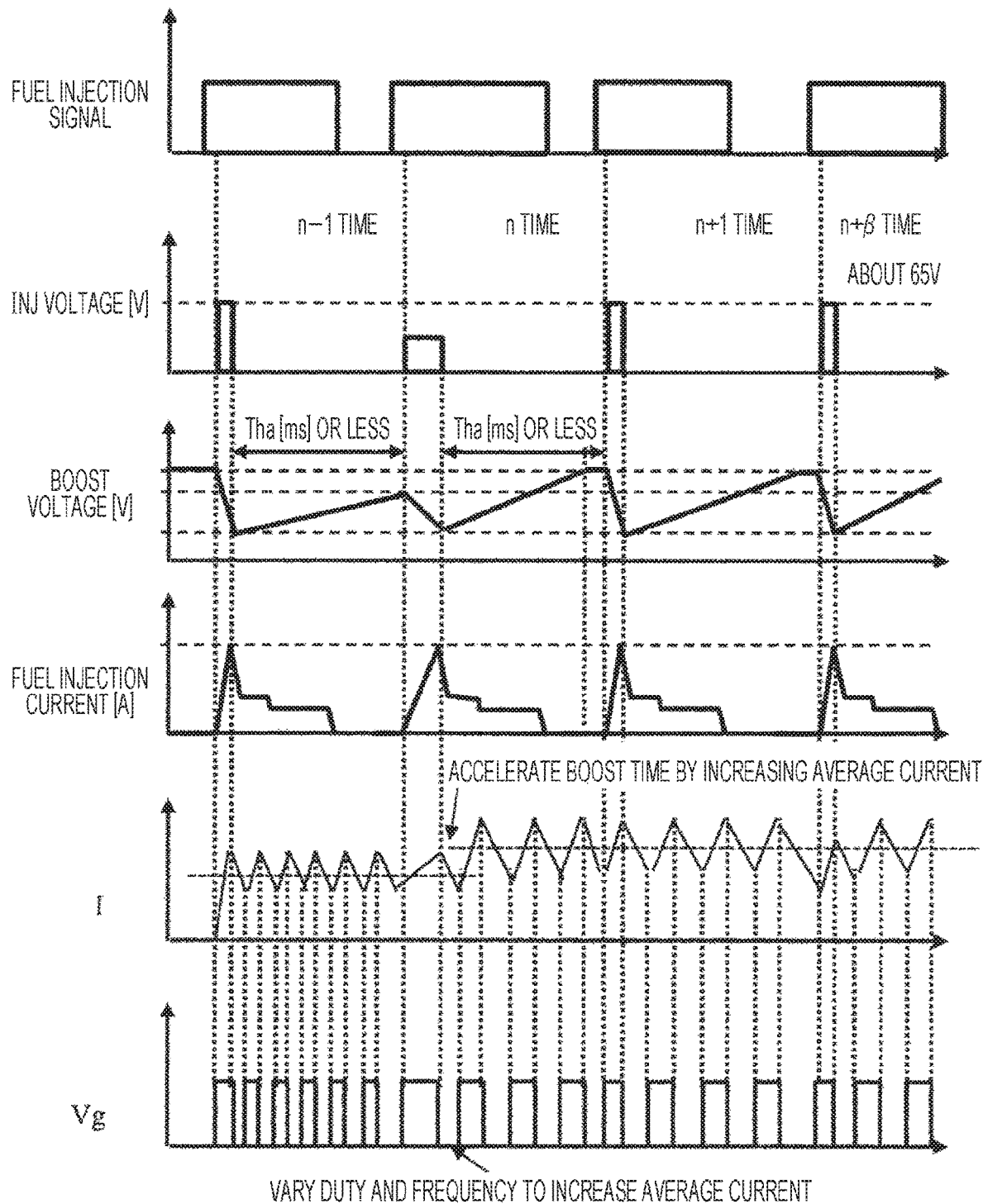
FIG. 3 is a diagram showing waveforms of the boost operations (speed-up of a boost speed) of the booster device for driving the injector shown in FIG. 1.

FIG. 3 is a diagram for explaining the first embodiment of the present invention. FIG. 3 is an example in which, when the fuel injection is performed, upon the close injection timing at which the next fuel injection is performed before the boost voltage for performing the fuel injection reaches the target voltage, a boost speed (charging speed) is controlled to be accelerated by increasing the average value of the boost current by varying the duty and frequency for turning on and off the switching element for the boost (boost driver 1).

Since the boost speed is determined by the average current value of the booster circuit 51, the speed can be controlled by controlling the on/off time of the switching element for the boost, that is, with the duty and cycle of the switching element for the boost. For example, to increase the boost speed, the average current value upon the boost is increased by changing the duty and cycle of the switching element for the boost. Thus, the energy for performing the boost is increased, and the boost speed is increased.

In this embodiment, when a decision period indicating a period corresponding to an injection interval of the injector is equal to or less than a first threshold value Tha, the boost gate control circuit 11 controls the boost driver 1 (switching element) to be turned on/off so as to increase the charging speed of the boost capacitor 7. That is, when the decision period is equal to or less than the first threshold value Tha, the boost gate control circuit 11 controls of the boost driver 1 to be turned on/off so as to increase at least one of a duty ratio and a switching frequency of the boost driver 1.

In this embodiment, a counter measures as the decision period a period between a timing at which the conduction current of the injector reaches the peak current indicating a predetermined current value for the first injection and a timing at which the voltage of the boost capacitor 7 is applied to the injector for the second injection (a timing at which a pulse of a fuel injection signal rises). The conduction current of the injector is measured with, for example, a current sensor (not shown).

Note that the counter may measure as the decision period a period between a timing at which the voltage of the boost capacitor 7 is applied to the injector and a timing at which the conduction current of the injector reaches the peak current indicating the predetermined current value. In other words, the decision period at this time is a period during which the voltage of the boost capacitor 7 is applied to the injector.

As described above, according to this embodiment, even when the fuel injection interval is short, the insufficiency of the boost voltage applied to the injector can be suppressed.

Specifically, since the difference between the fuel injection characteristics, which is caused by the close injection timing at which the next fuel injection is performed before the boost for performing the fuel injection reaches the target voltage, can be suppressed, a constant boost voltage can be supplied to the fuel injection valve. Therefore, the rise time of the current for opening the valve can be constant, the precision of the injection amount can be maintained, and the deterioration of the exhaust can be suppressed.

Second Embodiment

Figure 4:
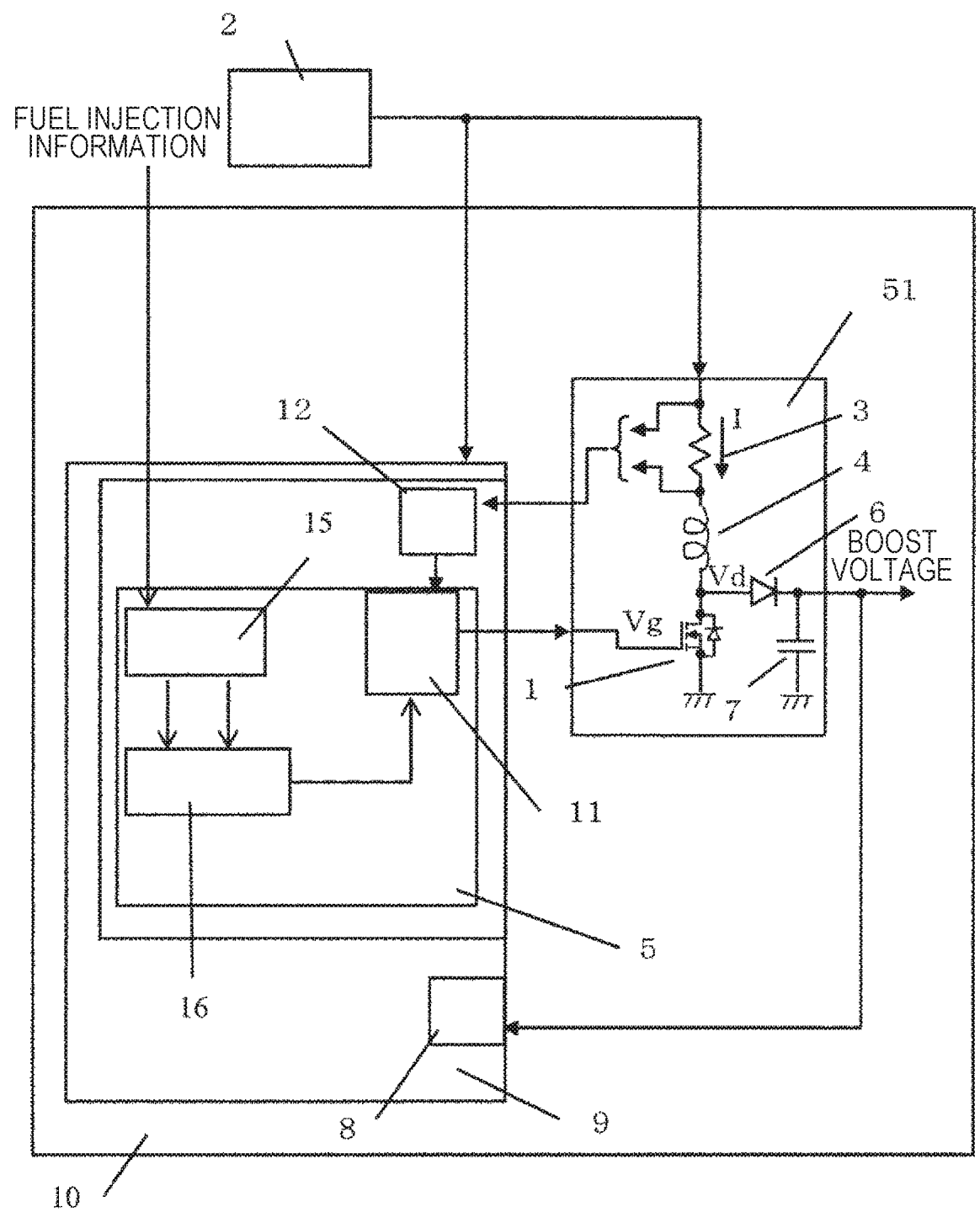
FIG. 4 is a configuration diagram of a booster device for driving an injector according to the second embodiment of the present invention.
Figure 5:
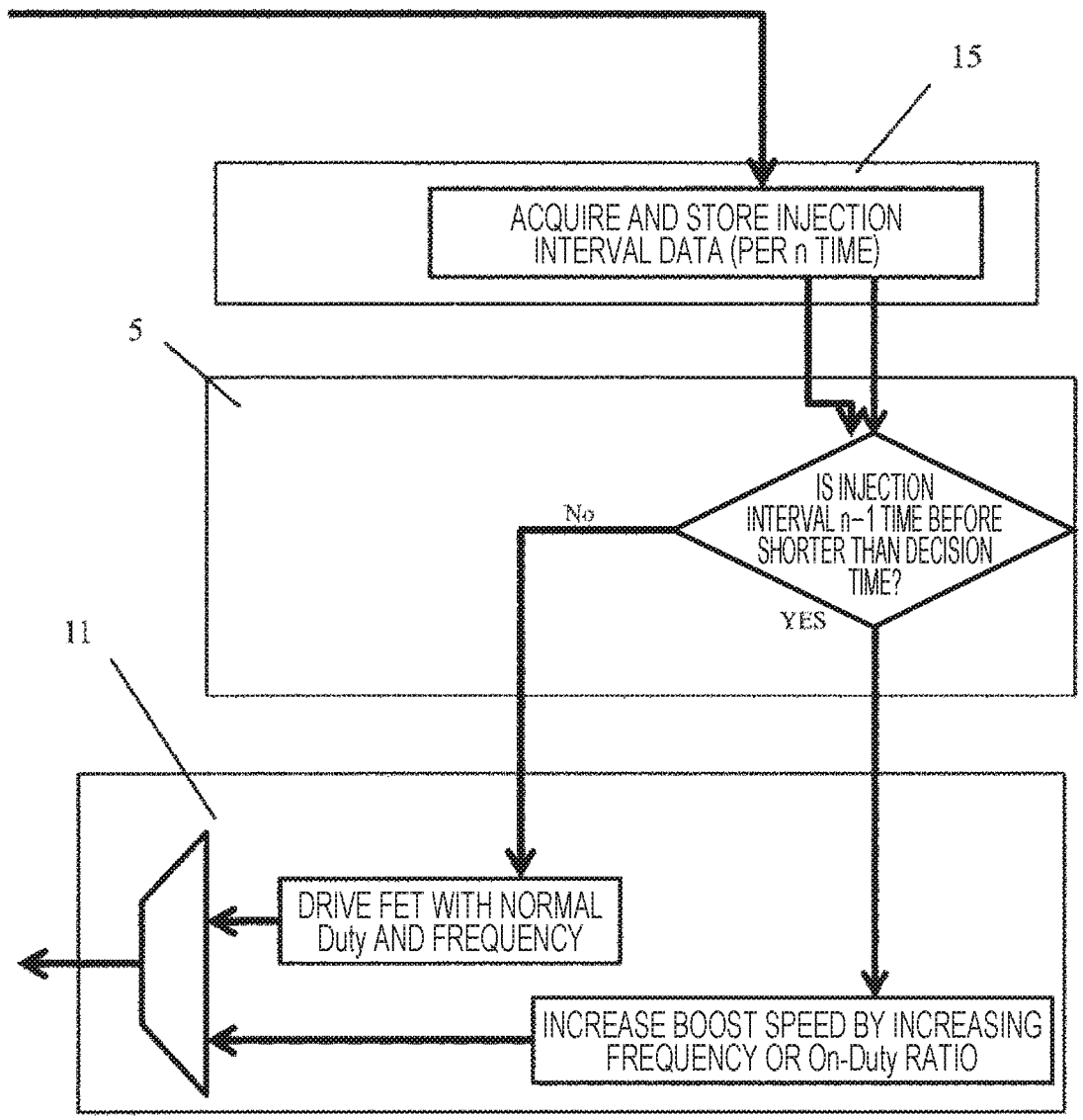
FIG. 5 is a diagram showing a control flow of the booster circuit drive unit shown in FIG. 4.

FIG. 4 is the circuit configuration of the second embodiment of the present invention, and FIG. 5 is a control flow of a booster circuit drive unit 5 for achieving FIG. 4. The circuit configuration is configured with the aforementioned circuit configuration in FIG. 1 including a fuel injection information record circuit 15 and a decision circuit 16.

To the fuel injection information record circuit 15, at least one of a rotation signal of an internal combustion engine, an output of a crank angle sensor of the internal combustion engine, setting information on a split injection interval and setting information on the number of split injections, which are fuel injection information, is inputted. A counter which measures an interval of inputting fuel injection signals and a memory which records the above fuel injection information are incorporated inside the fuel injection information record circuit 15, and present and past fuel injection interval information is outputted to the decision circuit 16.

The decision circuit 16 compares the present and past fuel injection interval information inputted from the fuel injection information record circuit 15, performs a comparison as to whether the comparison result is shorter or longer than a predetermined decision time, and outputs the result to the boost gate control circuit 11. When it is necessary to increase the boost speed based on the result obtained from the decision circuit 16, the boost gate control circuit 11 varies the duty and frequency to turn on and off the switching element for the boost and increases the average value of the boost current, thereby controlling the boost speed to be accelerated.

This can eliminate the difference between the fuel injection characteristics, which is caused by the close injection timing at which the next fuel injection is performed before the boost for performing the fuel injection reaches the target voltage. Thus, a constant boost voltage can be supplied to the fuel injection valve so that the rise time of the current for opening the valve can be constant.

The aforementioned embodiment is an example in which the control is performed based on at least one of the rotation signal of the internal combustion engine and the output of the crank angle sensor of the internal combustion engine. In the aforementioned case, the injection information on an n−1 time, the past injection information, is used to give an n time injection the feedback. Thus, the speed-up of the boost cannot be controlled for the n−1 time injection. However, when setting information on the split injection interval can be obtained in advance, the boost speed can be varied at real time.

In other words, the injector may perform split injections which inject the fuel a plurality of times during one combustion cycle of a cylinder injection type internal combustion engine which injects the fuel directly into the cylinder, and the boost gate control circuit 11 may predict the decision period based on at least one of the split injection interval during the one combustion cycle, the rotation speed of the cylinder injection type internal combustion engine, the output of the crank angle sensor of the cylinder injection type internal combustion engine, the setting information on the split injection interval, and the setting information on the number of the split injections.

Third Embodiment

Figure 6:
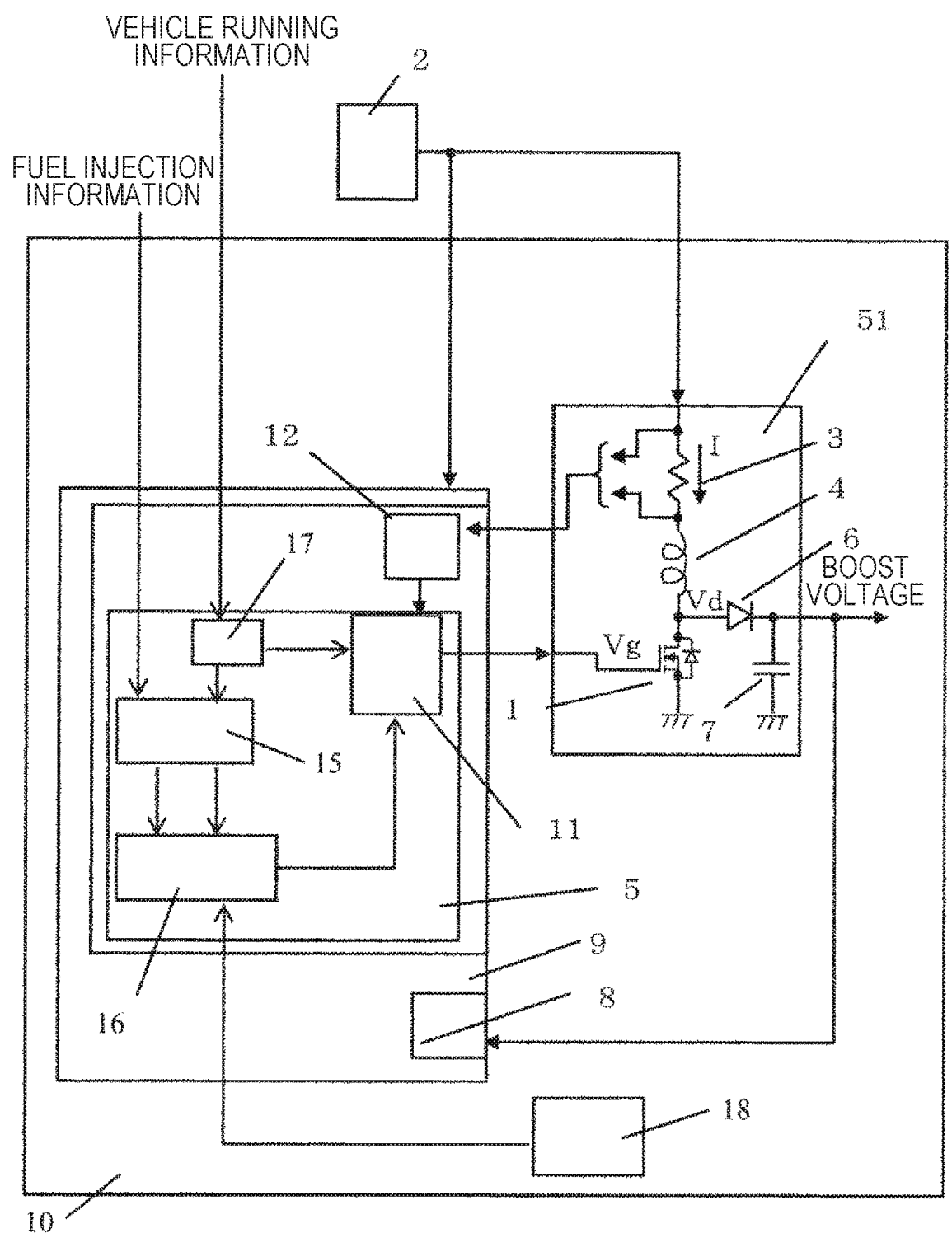
FIG. 6 is a configuration diagram of a booster device for driving an injector according to the third embodiment of the present invention.
Figure 7:
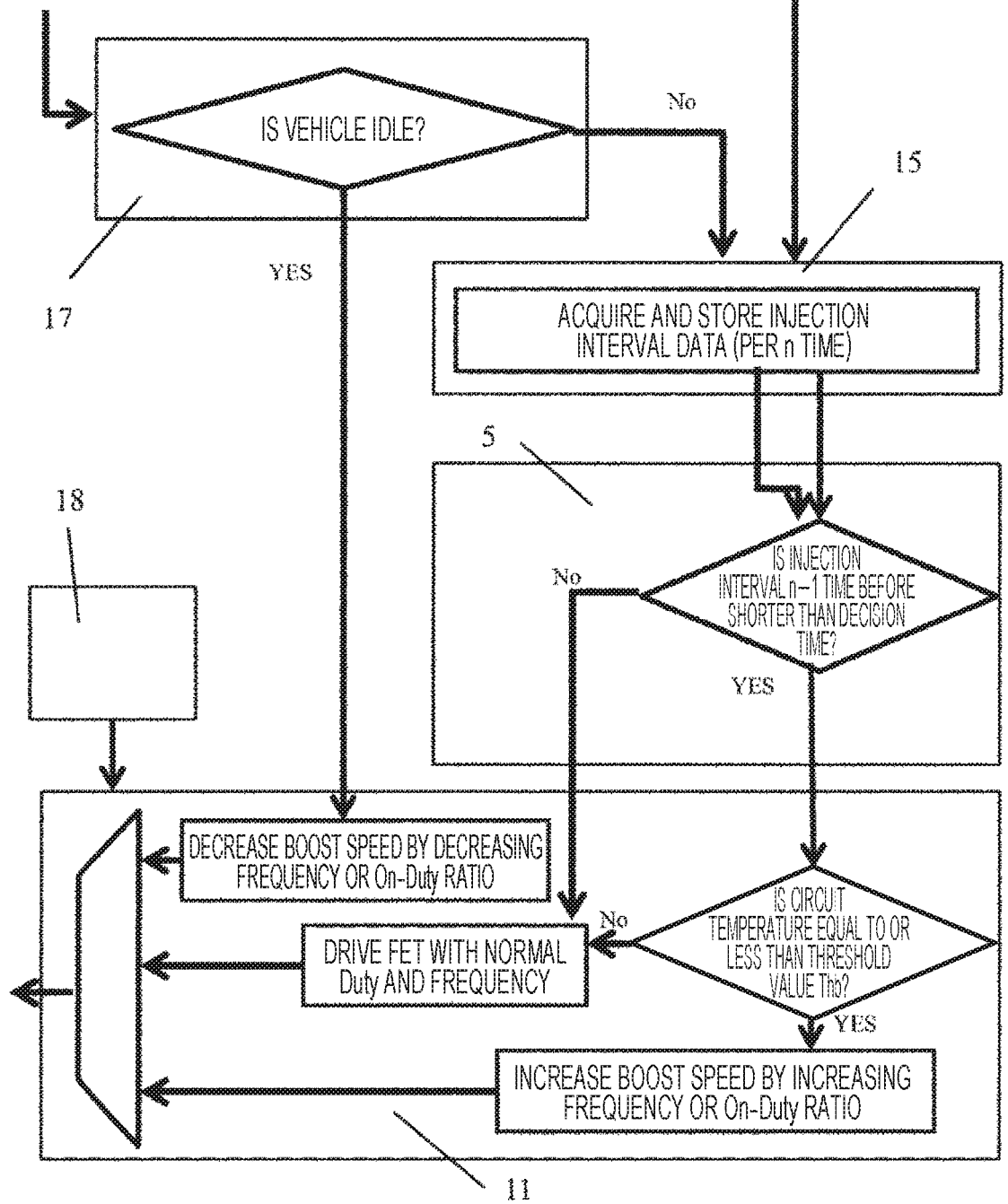
FIG. 7 is a diagram showing a control flow of the booster circuit drive unit shown in FIG. 6.

FIG. 6 is the circuit configuration of the third embodiment of the present invention, and FIG. 7 is a control flow of the booster circuit drive unit 5 for achieving FIG. 6. The circuit configuration is configured with the aforementioned configuration in FIG. 5 including an idle decision circuit 17 and a booster circuit temperature detection circuit 18.

Herein, the booster circuit temperature detection circuit 18 (temperature sensor) measures the temperature of a booster device for driving the injector 10.

At least one of brake information, parking information, gear information and idle stop information, which are vehicle running information, is inputted to the idle decision circuit 17. The idle decision circuit 17 judges (decides) based on the inputted information whether or not the rotation speed of the engine (internal combustion engine) is in an idle state maintained at a constant low speed. When the vehicle is judged as being in the idle state, the idle decision circuit 17 sends a signal indicating the idle state directly to the boost gate control circuit 11.

The boost gate circuit 11 received the signal indicating the idle state from the idle decision circuit 17 varies the duty and the frequency to turn on and off the switching element for the boost, decreases the average value of the boost current and controls the boost speed to be decelerated.

In other words, when the engine (internal combustion engine) is decided as being in the idle state, the boost gate control circuit 11 controls the boost driver 1 to be turned on/off so as to decrease at least one of the duty ratio and the switching frequency of the boost driver 1 (switching element).

Thus, excessive boost control is suppressed, an increase in the temperature of the booster device for driving the injector 10 is suppressed, and the power consumption is suppressed. On the other hand, when the idle decision circuit 17 does not decide the idle state, the idle decision circuit 17 sends a signal indicating a non-idle state to the fuel injection information record circuit 15.

The fuel injection information record circuit 15 which has judged the non-idle state outputs the present and past fuel injection interval information to the decision circuit 16 as in the second embodiment. The decision circuit 16 compares the present and past fuel injection interval information inputted from the fuel injection information record circuit 15, performs a comparison as to whether the comparison result is shorter or longer than a predetermined decision time, and outputs the result to the boost gate control circuit 11.

Herein, in the second embodiment, when it is necessary to increase the boost speed, the boost gate control circuit 11 varies the duty and frequency to turn on and off the switching element for the boost and increases the average value of the boost current, thereby controlling the boost speed to be accelerated. On the other hand, in this embodiment, when the temperature information is received from the booster circuit temperature detection circuit 18 and the temperature information is higher than a threshold value, the booster device for driving the injector 10 is judged as being overworked, and the boost gate control circuit 11 stops the acceleration of the boost speed.

With this control, a constant boost voltage cannot be supplied to the fuel injection valve, and the rise time of the current for opening the valve cannot be constant. However, circuit damage and a decrease in boost efficiency due to an excessive increase in the temperature of the booster circuit temperature detection circuit 18 can be prevented.

Herein, when the decision period indicating the period corresponding to the injection interval of the injector is equal to or less than the first threshold value Tha and the temperature of the booster device for driving the injector 10 is equal to or less than a second threshold value Thb, the boost gate control circuit 11 controls the boost driver 1 to be turned on/off so as to increase at least one of the duty ratio and the switching frequency of the boost driver 1 (switching element).

Note that, in this embodiment, the booster device for driving the injector 10 includes the idle decision circuit 17 and the booster circuit temperature detection circuit 18 (temperature sensor), but may include only one of them.

Fourth Embodiment

Figure 8:
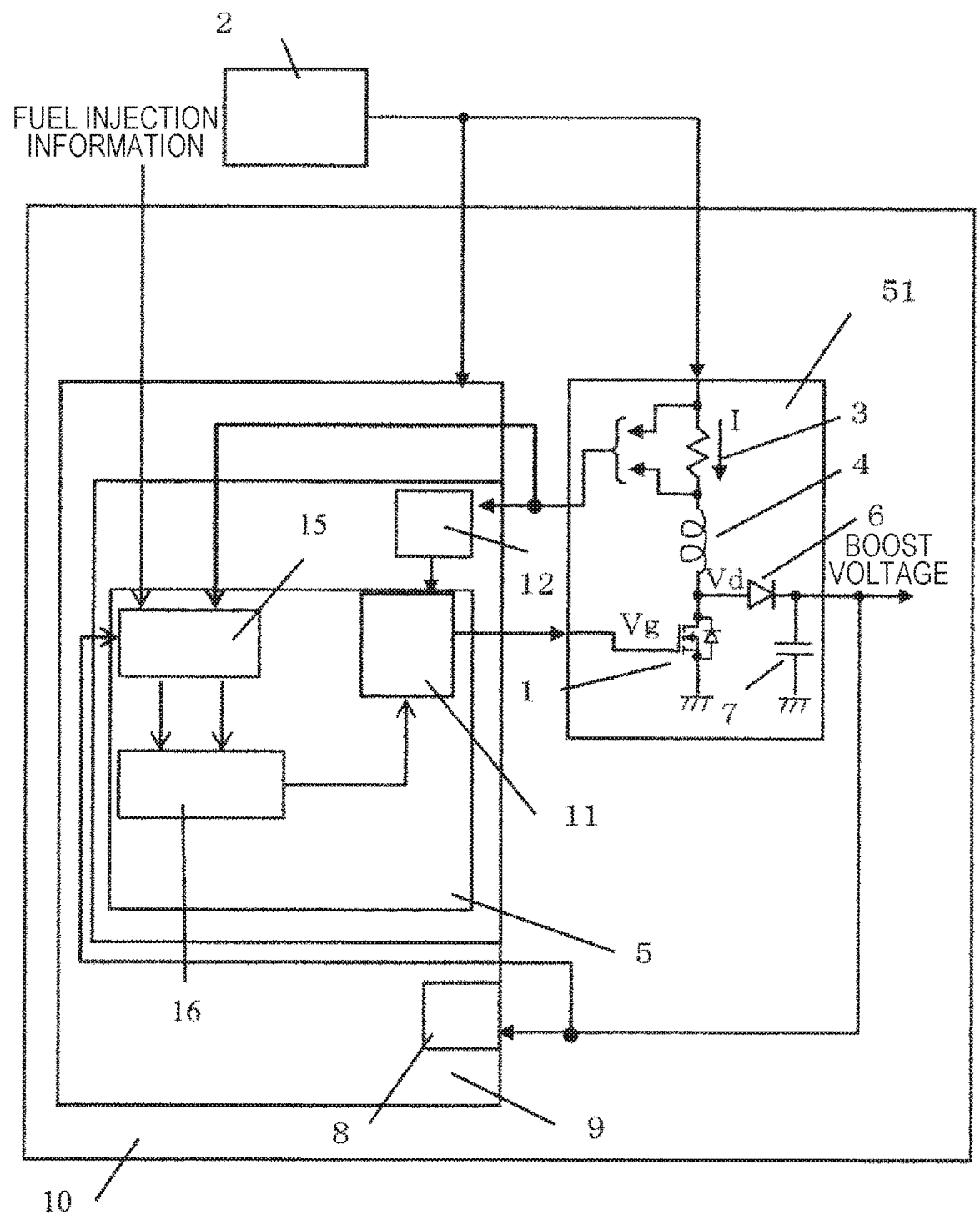
FIG. 8 is a configuration diagram of a booster device for driving an injector according to the fourth embodiment of the present invention.
Figure 9:
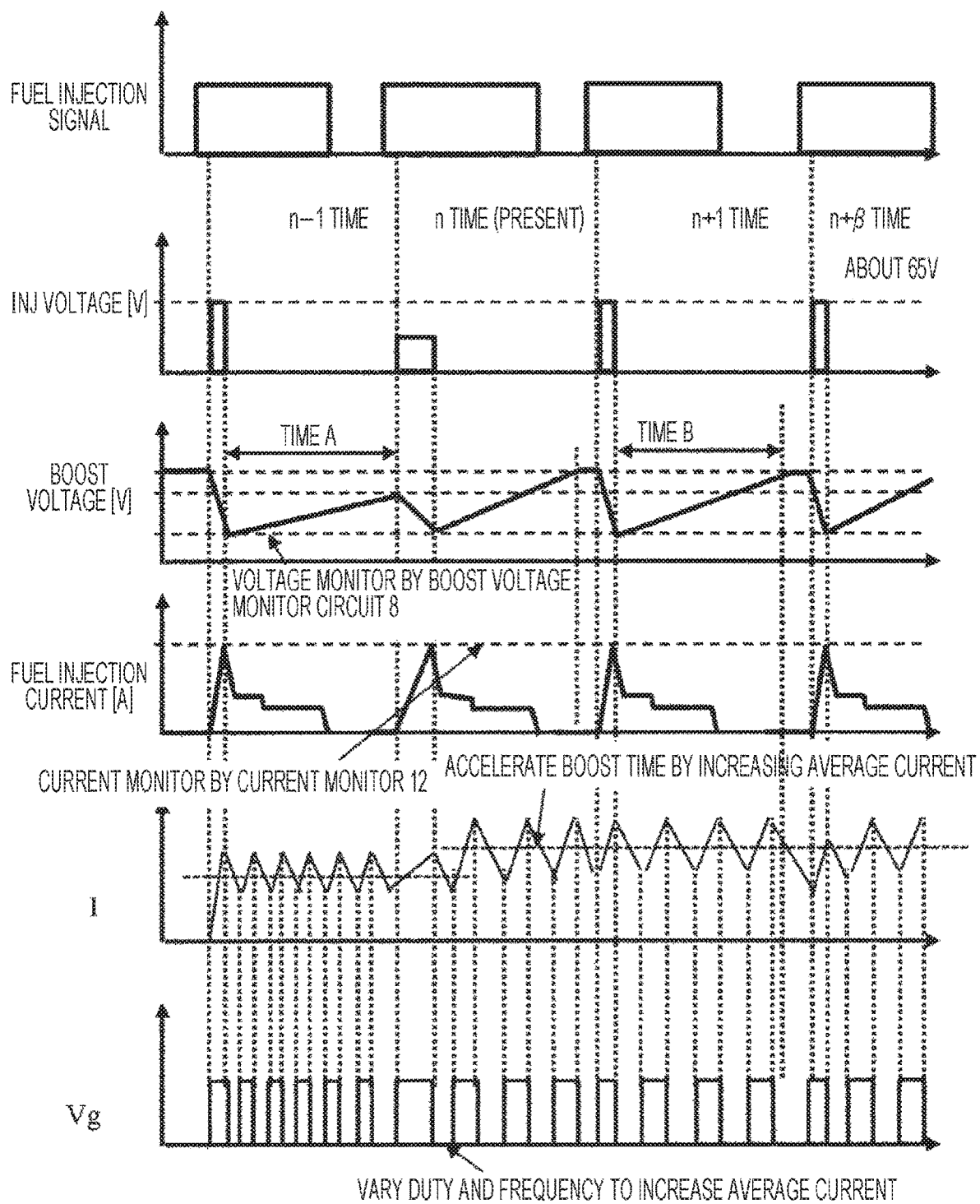
FIG. 9 is a diagram showing waveforms of the boost operations (speed-up of a boosting speed) of the booster device for driving the injector shown in FIG. 8.

FIG. 8 is the circuit configuration of the fourth embodiment of the present invention, and FIG. 9 is a diagram showing waveforms of the boost operations of the booster device for driving the injector shown in FIG. 8. The circuit configuration in FIG. 8 is configured so that the current value obtained by the current monitor circuit 12 and the boost voltage value obtained by the boost voltage monitor circuit 8 are fed back to the fuel injection information record circuit 15 in the circuit configuration in FIG. 4.

In other words, the boost voltage monitor circuit 8 (voltage sensor) measures the voltage of the boost capacitor 7.

In addition to the aforementioned counter which measures the interval between the inputting fuel injection signals, the fuel injection information record circuit 15 includes a counter and a memory. The counter measures a time A and a time B, and the memory stores the time A and the time B. The maximum point of the current value in the current information is defined as a fuel injection current peak. The time A is a time taken to reach the fuel injection current peak when the fuel injection signal is inputted before the boost voltage value reaches the target voltage by using the boost voltage value obtained by the boost voltage monitor circuit 8 and the fuel injection current peak is reached. The time B is a time taken for the boost voltage value to reach the target voltage value.

In other words, the counter measures as the first threshold value Tha a period B from a timing at which the conduction current of the injector reaches the peak current until the voltage of the boost capacitor 7 reaches the target voltage again after the voltage of the boost capacitor 7 reaches the target voltage and the voltage of the boost capacitor 7 is applied to the injector.

Meanwhile, a plurality of preset set values of the duty and frequency for turning on and off the switching element for the boost are prepared for the respective boost speeds.

The time A and the time B, which are measured by the counter are compared. When the time B is shorter than the time A, it is judged that the valve opening time of the fuel injection valve has come before the boost voltage value reaches the target voltage, and the boost speed is accelerated by using the set value of the boost speed according to the difference between the time B and the time A.

In other words, the boost gate control circuit 11 controls the boost driver 1 to be turned on/off so as to increase at least one of the duty ratio and the switching frequency of the boost driver 1 (switching element) as the difference obtained by subtracting the time A (decision period) from the time B (first threshold value Tha) increases.

On the contrary, when the time B is longer than the time A, it is judged that a constant boost voltage can be supplied to the fuel injection valve, and the boost speed is maintained or decelerated. According to this embodiment, an optimum boost time suitable for each fuel injection time can be selected, and the rise time of the current for opening the fuel injection valve can be constant. Moreover, by suppressing an unnecessary boost, it is possible to suppress a temperature increase in the booster device for driving the injector 10 and suppress the power consumption.

Note that the present invention is not limited to the above embodiments and includes various modifications. For example, the detailed description of the above embodiments has been made so that the present invention can be easily understood, and the present invention is not necessarily limited to the ones including all the configurations which have been described. Moreover, a part of the configuration of a certain embodiment can be replaced with the configurations of other embodiments, and the configurations of other embodiments can also be added to the configuration of the certain embodiment. Furthermore, a part of the configuration of each embodiment can be made with addition, deletion and replacement of other configurations.

Further, each of the above configurations, functions and the like may be achieved by hardware by designing a part or the whole thereof, for example, by an integrated circuit. In addition, each of the above configurations, functions and the like may be achieved by software by a processor interpreting and executing a program which achieves each function. Information such as a program, a table, a file and the like which achieves each function can be stored in a recording device such as a memory, a hard disk or a solid state drive (SSD), or a recording medium such as an IC card, an SD card or a DVD.

Note that the embodiments of the present invention may have the following aspects.

(1) A fuel injection valve drive device including a booster circuit which boosts an input voltage by performing operation of turning on and off a boost switching element to charge a capacitor for the boost with conduction energy of a boost coil, in which the fuel injection valve drive device, which drives a fuel injection valve of an internal combustion engine by using a voltage of the capacitor the boost boosted by the booster circuit, adjusts a charging speed of the capacitor for the boost based on an injection interval of the fuel injection valve.

(2) The fuel injection valve drive device according to (1), in which the fuel injection valve drive device adjusts the charging speed of the capacitor for the boost by varying at least one of an on/off period of the boost switching element, an amount of a conduction current of the boost switching element and a duty ratio.

(3) The fuel injection valve drive device according to any one of (1) and (2), in which the fuel injection valve drive device performs split injections which inject fuel a plurality of times during one combustion cycle of a cylinder injection type internal combustion engine which injects the fuel directly to a cylinder, and the injection interval is based on at least one of a split injection interval during a preceding one combustion cycle, a rotation speed of the internal combustion engine, an output of a crank angle sensor of the internal combustion engine, setting information on the split injection interval and setting information on a number of the split injections.

(4) The fuel injection valve drive device according to (3), the fuel injection valve drive device estimates a split injection time for second and subsequent times during the one combustion cycle and adjusts the charging speed of the capacitor for the boost based on the split injection time.

(5) The fuel injection valve drive device according to any one of (1) to (4), in which the charging speed of the capacitor for the boost is adjusted based on whether or not the internal combustion engine is in an idling state.

(6) The fuel injection device according to (1), in which an increase in the charging speed of the capacitor for the boost is permitted or prohibited based on a temperature of the fuel injection valve drive device.

(7) The fuel injection valve drive device according to (4), in which the fuel injection valve drive device detects a time at which supply of the boost voltage to the fuel injection valve ends, and adjusts the charging speed of the capacitor for the boost based on a counter value which is started to be counted from the time.

REFERENCE SIGNS LIST 1 boost driver
2 battery
3 shunt resistor
4 boost coil
5 booster circuit drive unit
6 boost diode
7 boost capacitor
8 boost voltage monitor circuit
9 driver IC
10 booster device for driving injector
11 boost gate control circuit
12 current monitor circuit
15 fuel injection information record circuit
16 decision circuit
17 idle decision circuit
18 booster circuit temperature detection circuit
51 booster circuit

The invention claimed is:

1. A booster device for driving an injector, comprising:
a coil;
a switching element which is connected to the coil in series and turns on and off conduction of the coil; a capacitor for applying a voltage to the injector;
a diode having an anode connected to a connection point of the coil and the switching element and a cathode connected to the capacitor;
a voltage sensor which measures a voltage of the capacitor; and
a control circuit which controls the switching element to be turned on and off so as to increase a charging speed of the capacitor when a decision period indicating a period corresponding to an injection interval of the injector is equal to or less than a first threshold value, wherein
the control circuit measures as the first threshold value a period corresponding to a boost time based on the voltage of the capacitor measured by the voltage sensor.

2. The booster device for driving the injector according to claim 1, wherein the control circuit controls the switching element to be turned on and off so as to increase at least one of a duty ratio and a switching frequency of the switching element when the decision period is equal to or less than the first threshold value.

3. The booster device for driving the injector according to claim 1, wherein the injector performs split injections which inject fuel a plurality of times during one combustion cycle of a cylinder injection type internal combustion engine which directly injects the fuel into a cylinder, and
the control circuit predicts the decision period based on at least one of a split injection interval during the one combustion cycle, a rotation speed of the cylinder injection type internal combustion engine, an output of a crank angle sensor of the cylinder injection type internal combustion engine, setting information on the split injection interval, and setting information on a number of the split injections.

4. The booster device for driving the injector according to claim 1, further comprising an idle decision circuit which decides whether or not an internal combustion engine is in an idle state,
wherein the control circuit controls the switching element to be turned on and off so as to decrease at least one of a duty ratio and a switching frequency of the switching element when the internal combustion engine is decided as being in the idle state.

5. The booster device for driving the injector according to claim 1, further comprising a temperature sensor which measures a temperature of the booster device for driving the injector,
wherein the control circuit controls the switching element to be turned on and off so as to increase at least one of a duty ratio and a switching frequency of the switching element when the decision period is equal to or less than the first threshold value and the temperature of the booster device for driving the injector is equal to or less than a second threshold value.

6. The booster device for driving the injector according to claim 1, further comprising:
a current sensor which measures a conduction current of the injector, wherein
the control circuit also measures as the decision period a period between a timing at which the conduction current of the injector reaches a peak current indicating a predetermined current value for a first injection and a timing at which a voltage of the capacitor is applied of the injector for a second injection.

7. The booster device for driving the injector according to claim 1, further comprising:
a current sensor which measures a conduction current of the injector, wherein
the control circuit measures as the decision period a period between a timing at which a voltage of the capacitor is applied to the injector and a timing at which the conduction current of the injector reaches a peak current indicating a predetermined current value.

8. The booster device for driving the injector according to claim 6, further comprising a voltage sensor which measures the voltage of the capacitor,
    wherein the control circuit measures as the first threshold value a period from a timing at which the conduction current of the injector reaches the peak current until the voltage of the capacitor reaches a target voltage again after the voltage of the capacitor reaches the target voltage and the voltage of the capacitor is applied to the injector.

9. The booster device for driving the injector according to claim 1, wherein the control circuit controls the switching element to be turned on and off so as to increase at least one of a duty ratio and a switching frequency of the switching element as a difference obtained by subtracting the decision period from the first threshold value increases.

* * * * *